United States Patent [19]

Cooper

[11] Patent Number: 5,280,947
[45] Date of Patent: Jan. 25, 1994

[54] ONE PIECE INVISIBLE AIRBAG DOOR AND HINGE

[75] Inventor: Robert Cooper, Oshawa, Canada

[73] Assignee: Davidson Textron Inc., Dover, N.H.

[21] Appl. No.: 969,953

[22] Filed: Nov. 2, 1992

[51] Int. Cl.⁵ .............................................. B60R 21/16
[52] U.S. Cl. ................................. 280/728 B; 280/752
[58] Field of Search ............ 280/728 A, 728 B, 752 R, 280/731, 732, 743

[56] References Cited

U.S. PATENT DOCUMENTS

| | | | |
|---|---|---|---|
| 4,759,568 | 7/1988 | Paefgen et al. | 280/732 |
| 4,925,209 | 5/1990 | Sakurai | 280/728 |
| 5,035,444 | 7/1991 | Carter | 280/728 |
| 5,084,122 | 1/1992 | Fukushima et al. | 280/730 |
| 5,183,289 | 2/1993 | Zeller et al. | 280/731 |

Primary Examiner—David M. Mitchell
Assistant Examiner—Paul Dickson
Attorney, Agent, or Firm—Reising, Ethington, Barnard, Perry & Milton

[57] ABSTRACT

An airbag assembly (10) includes a sheet metal door subassembly (36) with a cross cut (40) and two side cuts (38) that fully covers an airbag escape opening (34) in a primary substrate (32). The inflation of the airbag (16) causes two doors (42) of the subassembly 36, to bend around the primary substrate (32) at upper and lower sides of an airbag escape opening (34). A cutting edge (44) is located at one end (46) of one of the two doors (42) and cuts an opening through the outer uninterrupted cover (25) so the airbag (16) may expand therethrough into the passenger compartment of a vehicle. The subassembly (36) has a continuous periphery (36a) that is connected by a reduced number of rivets (26).

4 Claims, 1 Drawing Sheet

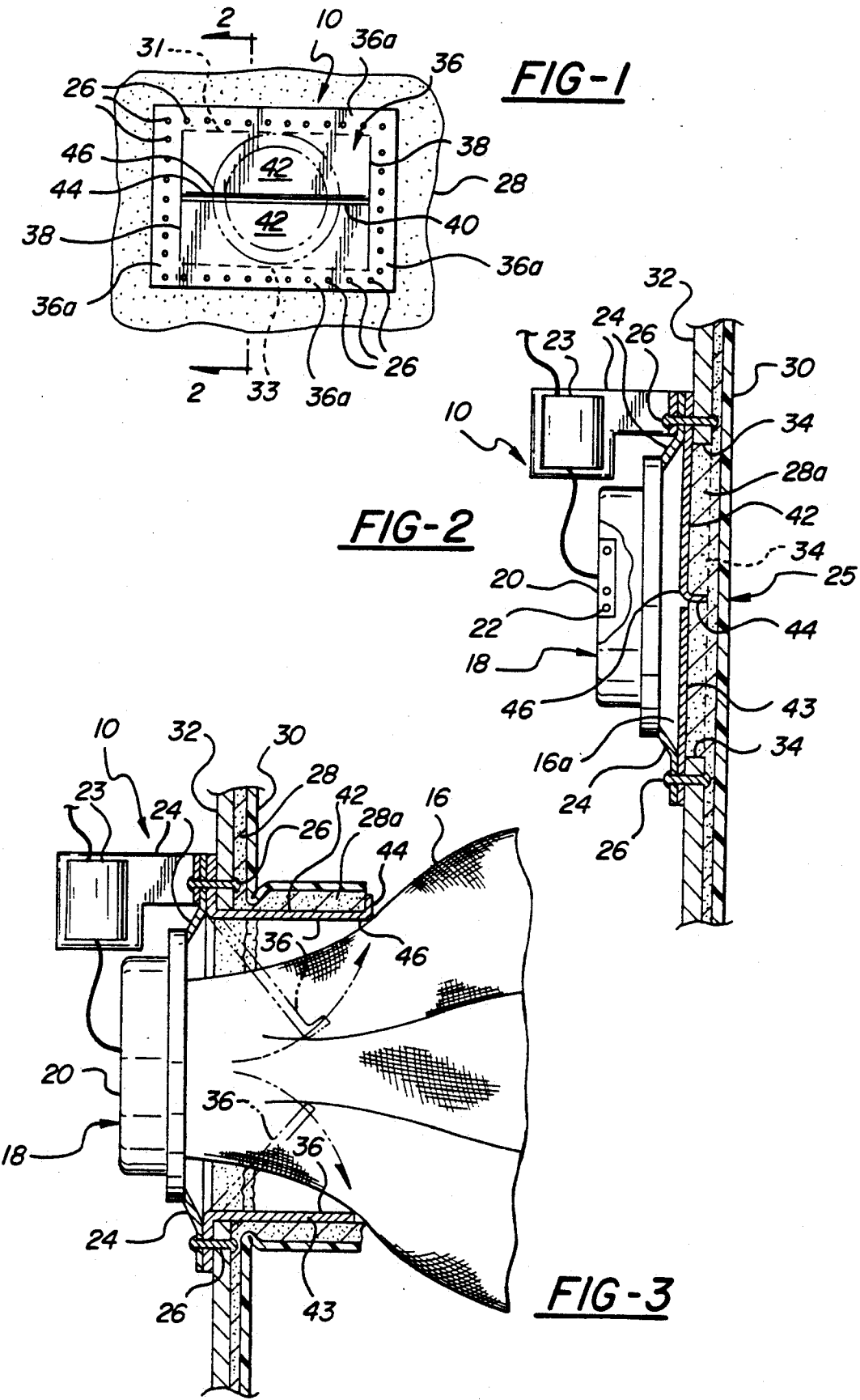

ONE PIECE INVISIBLE AIRBAG DOOR AND HINGE

BACKGROUND OF THE INVENTION

1. Field of the Invention

This invention relates to air bag restraint systems for vehicles and, more particularly, to such air bag restraint systems which are covered by a cover assembly for concealing the air bag restraint system in a vehicle passenger compartment as part of the instrument panel.

2. Description of Related Art

Various air bag restraint systems are known in which a cover assembly covers the air bag restraint components prior to deployment of an air bag into the vehicle passenger compartment.

U.S. Pat. No. 3,622,176 discloses a cover with a perforated outer skin. The problem with such an arrangement is that the weakened sections are visible and thus do not fully conceal the underlying air bag restraint system. Furthermore, such systems depend upon the force of the inflated air bag to tear the cover to form a deployment opening therein. Such tearing can at times hinder deployment in an undesirable manner.

U.S Pat. No. 4,097,064 discloses a cover assembly which carries a cutter to pierce the outer skin of the cover assembly. However, this arrangement requires separate inertially responsive shields for protecting the air bag during its deployment U.S. Pat. No. 4,246,213 discloses a cover assembly that includes a cover having weakened sections in the outer shell or skin of the cover assembly. This arrangement depends upon the tearing of the outer skin at the weakened sections for air bag deployment and presents the same disadvantages as in the case of the '176 patent.

U.S. Pat. Nos. 5,080,393 and 5,082,310 disclose cover assemblies in which substrates have a potential to fragment during airbag deployment.

SUMMARY OF THE INVENTION AND ADVANTAGES

An air bag assembly is disclosed wherein the air bag assembly is fully concealed within the instrument panel of the vehicle passenger compartment. The assembly comprises an air bag having collapsed and expanded conditions. An air bag housing means houses the air bag in the collapsed condition. A gas generating means injects a gas into the air bag to open the air bag from the collapsed condition to the expanded condition. The assembly further includes an outer uninterrupted cover displaced from the air bag for covering the air bag and the air bag housing means while the air bag is in the collapsed condition. A primary substrate is disposed adjacent and fixedly secured to the outer uninterrupted cover. The primary substrate includes a window disposed adjacent the air bag to allow the air bag to expand therethrough The assembly is characterized by a sheet metal door subassembly covering the window and fixedly secured to the primary substrate such that the sheet metal substrate covers the window of the primary substrate.

An advantage of the present invention is to provide a self-piercing cover assembly for an air bag restraint system in which a sheet metal door subassembly is configured to be fixedly secured to the primary substrate of the instrument panel so as to reduce the number of rivets, or other such securing means, between the primary substrate and the sheet metal door subassembly.

A further advantage of the present invention is that the sheet metal door subassembly strengthens the perimeter of the primary substrate window defining an air bag escape opening.

Yet another advantage of the present invention is to provide a cutter on the sheet metal door subassembly at a location disposed in the center of the air bag escape opening and operative to pierce the outer uninterrupted cover so as to reduce or eliminate substrate fragmentation.

Still another advantage of the invention is to form the cutter on an edge of a first door segment to face in the direction of the cover and to space the cutter from a second door segment at a gap between the first and second door segments whereby air bag deployment will cause the first and second door segments to swing apart so as to position smooth inner surfaces thereon in spaced parallelism to define the air bag escape opening.

Still another advantage of the present invention is to provide a positive attachment for the air bag housing means to the primary substrate, thus reducing the amount of added structural supports needed to maintain the air bag housing means with respect to the primary substrate means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a rear view of the preferred embodiment of the subject invention with the air bag housing shown in phantom;

FIG. 2 is a side view of the subject invention with the primary substrate and sheet metal door subassembly shown in cross-section and partially cut away; and FIG. 3 is a side view of the preferred embodiment of the subject invention with the primary substrate and sheet metal door subassembly shown in cross-section and partially cut away with the door subassembly fully open and with the air bag shown fully deployed.

DESCRIPTION OF THE PREFERRED EMBODIMENT

The subject invention is an air bag assembly for concealing a vehicular air bag and is generally shown at 10 in the drawings. The air bag assembly 10 allows for foam and vinyl shell layers, discussed subsequently, to extend across the air bag assembly 10 without cuts, doors, or perforations of any kind. Thus, the air bag assembly 10 is completely hidden from view of vehicle passengers.

The assembly 10 includes an air bag 16 having collapsed and expanded conditions. The air bag 16 is in the collapsed condition in FIG. 2 and in the expanded condition in FIG. 3. The design configuration of the air bag will vary depending on the location of the air bag 16 within the passenger compartment. For example, the air bag 16 will have a round flattened saucer configuration as inflated when installed in the steering wheel. The air bag 16 will have a larger rectangular configuration in its expanded condition when installed in the passenger side of the instrument panel.

The air bag assembly 10 further includes air bag housing means 18 for housing the air bag 16 in the collapsed condition. The air bag housing means 18 includes a housing 20 and a gas generating means 22. The air bag housing means further includes structural supports 24 which secure the air bag housing 20 at the location required for the proper inflation of the air bag 16 to its expanded condition. The air bag housing means further includes securing means 26 for securing the air bag housing means 18 in place. As may be seen in the FIGS. 2 and 3, the securing means 26 are shown as rivets 26. However, as is evident by those skilled in the art, the securing means 26 may be heat stakes, bolts, or screws.

The gas generating means 22 injects a gas into the air bag 16 to deploy the air bag 16 from a collapsed condition to an expanded condition. The gas generating means 22 inflates the air bag 16 when it receives a signal from a sensor 23, signaling a vehicle impact level at which passenger protection is desired. The gas generating means 22 generates a gas for inflating an air bag 16.

In accordance with one aspect of the invention, the air bag 16 and air bag housing means 18 are covered by an outer uninterrupted cover 25 that conceals the underlying inflatable restraint device including the airbag 16 and doors 42 to be described. The outer uninterrupted cover 25 is spaced in front or above the air bag 16 and covers the air bag 16 and the air bag housing means 18 while the air bag 16 is in the collapsed condition shown at 16a in FIG. 2. While the outer uninterrupted cover 25 is shown as having a urethane foam layer 28 with an outer vinyl shell 30 of various plastic polymers, it should be understood that the vinyl shell 30 can be formed as a more dense integral outer surface on the foam layer 28. Further, while an instrument panel is illustrated, the invention is equally suitable for use with other trim and products such as consoles and steering wheel covers. Further, the cover compositions and arrangements can have a different polymer composition than urethane foam. Suitable foam materials include low modulus elastomers such as reaction injection molded urethane materials having a flexural modulus in the range of 20 to 80,000 psi at 75° F. Examples of suitable shell materials include polyvinylchloride or other thermoplastic materials such as thermoplastic elastomers or thermoplastic olefins or thermoset urethanes. While exemplary materials for the cover assembly are disclosed herein, it should be understood that the invention is applicable for use with a wide range of other materials including fabrics (both natural and synthetic), leather, and other backing materials than the illustrated foam layers (which in certain cover assemblies can be omitted in the entirety).

A primary substrate 32 is disposed adjacent and fixedly secured to the outer uninterrupted cover 28. The primary substrate 32 includes an air bag escape opening 34, or window 34 of rectangular shape, disposed adjacent the air bag 16. The primary substrate 32 is a rigid structure to which the outer uninterrupted cover 25 receives its support. Depending on whether the air bag assembly 10 is installed in the instrument panel or a steering wheel determines what type of material comprises the primary substrate 32. Typically, examples of the primary substrate 32 will include thermoset plastics.

The air bag assembly 10 is characterized by a sheet metal door subassembly 36, that is disposed between the air bag 16 and the primary substrate 32. The subassembly 36 is fixedly secured to the primary substrate 32 such that the sheet metal door subassembly 36, when closed, covers the air bag escape opening 34.

The sheet metal door subassembly 36 has a predetermined thickness selected to bend around the primary substrate 32 upon the inflation of the air bag 16. The sheet metal door subassembly 36 further includes two side cuts 38 and a crosscut 40 forming an H-shaped cut 38,40 which extends through the predetermined thickness of the sheet metal door subassembly 36. The H-shaped cut 38,40 defines two doors 42,43 that open outwardly toward the passenger compartment of the vehicle upon inflation of the air bag 16. Upper and lower sides 31,33 of the air bag escape opening 34 act as hinges for the two doors because the two doors 42 must bend around those two sides 31,33 of the air bag escape opening 34 when forced open.

One feature of the present invention is that the subassembly 36 has a continuous periphery 36a that reinforces the escape opening 34. Consequently, the number of securing means 26 can be reduced as compared to connections of doors only at the top and bottom sides of the opening 34.

Another feature of the present invention is that the sheet metal substrate 36 includes cutting means 44 for cutting the cover as the sheet metal door subassembly 36 opens in response to the air bag 16 inflating into the expanded condition. The cutting means 44 includes a cutting edge 44 extending along the end 46 of the door 42. The cutting edge 44 extends perpendicularly to the door 42 in the direction of foam layer 28 and also extends into the foam layer 28 but does not extend to or through the outer uninterrupted cover.

The outer uninterrupted cover 25 has a foam layer 28a that fills the air bag escape opening 34. Therefore, the thickness of the outer uninterrupted cover 25 is greater at the location of the air bag 16 than at locations between the primary substrate 32 and the vinyl shell 30. Such structure provides a uniform outer uninterrupted cover 25 and hides the air bag escape opening 34 from the occupants of the vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An air bag assembly (10) for concealing a vehicular air bag (16), said assembly (10) comprising:

an air bag (16) having collapsed and expanded conditions;

air bag housing means (18) for housing said air bag (16) in said collapsed condition;

gas generating means (22) for injecting a gas into said air bag (16) to open said air bag (16) from said collapsed condition to said expanded condition;

an outer uninterrupted cover (25) displaced from said air bag (16) for covering said air bag (16) and said air bag housing means (18) while said air bag (16) is in said collapsed condition;

a primary substrate (32) disposed adjacent and fixedly secured to said outer uninterrupted cover (25), said primary substrate (32) including an air bag escape opening (34) disposed adjacent said air bag (16) to allow said air bag (16) to expand therethrough, said assembly (10) characterized by:

a sheet metal door subassembly (36) disposed between said air bag (16) and said primary substrate (32) and fixedly secured to said primary substrate (32) such that said sheet metal door subassembly (36) covers said air bag escape opening (34);

said sheet metal door subassembly (36) having a predetermined thickness having two side cuts (38) and a cross cut (40) forming a H-shaped cut extending through said predetermined thickness;

said sheet metal door subassembly (36) further including cutting means (44) for cutting said primary substrate (32) as said sheet metal substrate (36) opens in response to said air bag (16) opening into said expanded condition; and said cutting means (44) including a cutting edge (44) extending along said cross cut (40).

2. An air bag assembly (10) for concealing a vehicular air bag (16), said assembly (10) comprising:

an air bag (16) having collapsed and expanded conditions;

air bag housing means (18) for housing said air bag (16) in said collapsed condition;

gas generating means (22) for injecting a gas into said air bag (16) to open said air bag (16) from said collapsed condition to said expanded condition;

an outer uninterrupted cover (25) displaced from said air bag (16) for covering said air bag (16) and said air bag housing means (18) while said air bag (16) is in said collapsed condition;

a primary substrate (32) disposed adjacent and fixedly secured to said outer uninterrupted cover (25), said primary substrate (32) including an air bag escape opening (34) disposed adjacent said air bag (16) to allow said air bag (16) to expand therethrough, said assembly (10) characterized by:

a sheet metal door subassembly (36) disposed between said air bag (16) and said primary substrate (32) and fixedly secured to said primary substrate (32) such that said sheet metal door subassembly (36) covers said air bag escape opening (34);

said sheet metal door subassembly (36) having a predetermined thickness having two side cuts (38) and a cross cut (40) forming a H-shaped cut extending through said predetermined thickness;

said sheet metal door subassembly (36) further including cutting means (44) for cutting said primary substrate (32) as said sheet metal substrate (36) opens in response to said air bag (16) opening into said expanded condition;

said cutting means (44) including a cutting edge (44) extending along said cross cut (40); and said cutting edge (44) extending perpendicularly to said sheet metal substrate (36) into said air bag escape opening (34).

3. An air bag assembly (10) for concealing a vehicular air bag (16), said assembly (10) comprising:

an air bag (16) having collapsed and expanded conditions;

air bag housing means (18) for housing said air bag (16) in said collapsed condition;

gas generating means (22) for injecting a gas into said air bag (16) to open said air bag (16) from said collapsed condition to said expanded condition;

an outer uninterrupted cover (25) displaced from said air bag (16) for covering said air bag (16) and said air bag housing means (18) while said air bag (16) is in said collapsed condition;

a primary substrate (32) disposed adjacent and fixedly secured to said outer uninterrupted cover (25), said primary substrate (32) including an air bag escape opening (34) disposed adjacent said airbag (16) to allow said air bag (16) to expand therethrough, said assembly (10) characterized by:

a sheet metal door subassembly (36) disposed between said air bag (16) and said primary substrate (32) and fixedly secured to said primary substrate (32) such that said sheet metal door subassembly (36) covers said air bag escape opening (34);

said sheet metal door subassembly (36) having a predetermined thickness having two side cuts (38) and a cross cut (40) forming a H-shaped cut extending through said predetermined thickness;

said sheet metal door subassembly (36) further including cutting means (44) for cutting said primary substrate (32) as said sheet metal substrate (36) opens in response to said air bag (16) opening into said expanded condition;

said cutting means (44) including a cutting edge (44) extending along said cross cut (40);

said cutting edge (44) extending perpendicularly to said sheet metal substrate (36) into said air bag escape opening (34); and said outer uninterrupted cover (25) fixedly secured to said primary substrate (32) and filling said air bag escape opening (34).

4. An assembly (10) as set forth in claim 3 further characterized by a vinyl coating (30) covering all of said outer uninterrupted cover (25).

* * * * *